Patented May 25, 1943

2,320,088

UNITED STATES PATENT OFFICE 2,320,088

WATER - ALCOHOL SOLUTION OF AMINO ACID - DIAMINE - DIBASIC ACID INTERPOLYMERS

Robert M. Leekley, Philadelphia, Pa., assignor to E. I. du Pont de Nemours & Company, Wilmington, Del., a corporation of Delaware No Drawing. Application September 25, 1939, Serial No. 296,517

10 Claims. (Cl. 260—29)

This invention relates to compositions of matter and more particularly to new and useful fluid compositions comprising solutions of polyamides.

Of the synthetic linear polyamides described in U. S. Patents 2,071,250, 2,071,253, and 2,130,523, the simple types, that is, those derived from a single diamine and a single dibasic carboxylic acid or from a single amino acid, are characterized in part by high melting points, pronounced crystallinity, a stiffness which renders them impractical for certain uses where great pliability is desirable, and an insolubility in most solvents except mineral acids, formic acid, and phenols. These properties render it difficult to use them in coating compositions or other applications where the use of volatile nontoxic solvents is desirable.

A number of more soluble and more flexible polyamides are known which, though possessing many valuable properties, generally require the use of one or more relatively expensive ingredients. Such polyamides include those prepared from laterally substituted components such as beta-methyladipic acid, and four-component interpolyamides, such as those prepared from two different diamines and two different dibasic acids. Moreover, while possessing a wider range of solubility than the simple polyamides, such substituted polyamides and four component interpolyamides are still generally insoluble in the more common organic solvents, and are known to be truly soluble only in phenols, mineral acids, formic and acetic acid, unsaturated alcohols, and mixtures of alcohols with chlorinated hydrocarbons. Among the saturated alcohols, butanol and ethanol have been proposed for use, but ethanol exerts only a very slight solvent action and is useless for the preparation of solutions of appreciable solids content, whereas butanol solutions are stable—that is, remain fluid—only at elevated temperatures, and must therefore be used at temperatures above 80° C. Other alcohols and nonacidic organic materials show little or no solvent action for these polymers.

It is known that polyamides in general can be formed into many useful objects without the use of solvents, by spinning, extruding, or otherwise forming the object from the molten polymer. Although this fact is highly advantageous for many purposes, particularly in the manufacture of fibers, there are many advantages in the use of solutions instead of molten compositions to achieve the fluid state, particularly in the case of lacquers, adhesives and coating compositions. For example, in coating fabrics, paper, or other materials which are charred or tendered by high temperatures, the use of a solution which can be applied and subsequently evaporated to dryness at a relatively low temperature avoids deterioration of the base material. Solutions are also useful in forming various objects such as films, sheets, ribbons, bristles, and filaments. The incorporation of plasticizers or other modifying agents in the polyamide is frequently more advantageously done by the addition of plasticizer to a solution of polyamide rather than to a molten polyamide, since thorough mixing is assured and any tendency toward discoloration and decomposition of the polyamide or plasticizer is minimized. Furthermore, there is a tendency with certain types of plasticizers and modifying agents to be less compatible at the high temperatures required for blending in the melt, whereas they can be readily incorporated in the polyamide solution at a lower temperature. A still further advantage in the use of solutions lies in the ease with which they can be cast into films or coatings of uniform thickness, as compared with molten compositions. It is desirable, of course, that solutions retain their fluidity at room temperature or below. It is further desirable that such fluid compositions contain only nontoxic solvents.

Consequently it is an object of this invention to provide fluid, nontoxic polyamide interpolymer compositions which may be used at room temperature and are of value in the preparation of films, sheets, ribbons, bristles, and filaments and in the coating of metals, fabric, paper, regenerated cellulose, and the like. Other objects will appear hereinafter.

These objects are accomplished by employing a particular type of polyamide, namely, an interpolyamide of the kind described below, in solution in a solvent mixture comprising an alcohol and water.

The interpolyamides of the particular type in question may be formed by the interpolymerization of at least one diamine, at least one dibasic carboxylic acid or amide-forming derivative thereof, and at least one monoaminomonocarboxylic acid or amide-forming derivative thereof. These interpolyamides are characterized by the fact that upon hydrolysis with a mineral acid, e. g., hydrochloric, they yield the mineral acid salt of a diamine, the mineral acid salt of an aminocarboxylic acid, and a dibasic carboxylic acid. While having in large degree the strength, toughness, and durability characteristic of the simple polyamides, they are characterized further by their greater pliability and compatibility with modifying agents, such as plasticizers and resins, properties which render them of especial value in coating compositions and the like. The toughest and most valuable of these interpolymers are those of high molecular weight, which, as in the case of the simple polyamides, can be formed into filaments and sheets which are capable of being oriented by the application of stress, as by cold rolling or cold drawing. Such high molecular weight and orientable interpolymers generally have an intrinsic viscosity of at least 0.4, preferably at least 0.6, where intrinsic viscosity is defined as given in U. S. 2,154,436.

In such interpolymers, the weight ratio of diaminedibasic acid mixture to amino acid may vary from 1:9 to 9:1, the diamine and dibasic acid being used in substantially equimolecular amounts. Preferably, however, the weight ratios will be between 3:7 and 7:3.

Heretofore, the said diamine-amino acid-dibasic acid interpolyamides have been known to be soluble only in the solvents and solvent mixtures described above as solvents for the laterally substituted polyamides and the four-component interpolyamides. But now, as hereinabove stated, it has been found that the diamine-amino acid-dibasic acid interpolyamides can be dissolved readily in mixtures of alcohol and water, and that the resulting solutions can be cast into clear films and coated on fabrics, metal, paper, and the like at room temperature. In such solutions, the water contributes actual solvent action, and is not a mere diluent. For example, while ethanol has no appreciable solvent action on these interpolyamides, ethanol-water mixtures containing as little as 10% water are solvents for these interpolymers at temperatures at or only slightly above room temperature.

In most cases, the interpolyamide solutions can be prepared conveniently by agitating the polymer with the alcohol-water mixture under reflux at a somewhat elevated temperature. Such a solution, if sufficiently dilute, will remain indefinitely stable at room temperature. Concentrated solutions will become cloudy and finally gel upon long standing at room temperature. Such gels, however, may readily be remelted for use by heating, with or without stirring. Frequently they may be liquefied simply by vigorous stirring at room temperature. It is usually desirable to use the solutions while they are still clear. Cloudy solutions may readily be clarified and rendered clear for use by reheating with or without stirring.

In preparing the solutions, it is generally desirable to continue heating and stirring for two to three hours after the solution appears to be homogeneous, since stability at room temperature is increased by such treatment. Properly prepared solutions may be kept fluid for indefinite periods, without appreciable change in properties, by storage, with or without stirring, at somewhat elevated temperatures, which will vary with the particular components of the solution. Modifying agents such as amylbenzenesulfonamide, or pigments, may be added before or during the stirring.

A variety of alcohols may be used in conjunction with water to form solutions of these interpolyamides. The most valuable from a practical standpoint, however, is ethanol, which is relatively nontoxic, readily available, easily recovered in a solvent recovery system, and of an appropriate boiling point for the convenient casting of films, spinning of filaments, and similar manipulations. The use of ethanol that has been commercially denatured, as by the addition of small amounts of benzene, is possible in the practice of this invention, the small amount of denaturant present having no deleterious effect on the properties of solutions prepared therefrom.

Of the interpolyamides, a particularly valuable member is that prepared by the interpolymerization of hexamethylene diammonium adipate with omega-aminocaproic acid or its amide-forming derivatives, since this interpolymer is prepared from readily available ingredients and possesses good tensile strength, flexibility, and compatibility.

In particular, the interpolyamide prepared from 6 parts of hexamethylene diammonium adipate and 4 parts of omega-aminocaproic acid or an amide-forming derivative thereof, such as caprolactam or omega-aminocapronitrile, is of especial value, since it melts at 165–175° C., a temperature high enough to allow its application in many uses, yet low enough to permit easy softening during certain important fabricating steps, such as the embossing of coated fabrics. The invention will therefore be described with particular reference to this preferred interpolymer, although it will be understood that the processes described will differ only in degree for other interpolymers prepared from a diamine, a dibasic acid, and an amino acid.

The following examples will serve to illustrate the invention in greater detail. All parts are by weight unless otherwise specified.

*Example I*

A mixture of 10 parts of the interpolymer having an intrinsic viscosity of 1.29 prepared from 6 parts of hexamethylene diammonium adipate and 4 parts of caprolactam, 25.3 parts of ethanol, and 8 parts of water was stirred under reflux and heated at 70° C. The polymer dissolved and the composition became clear and homogeneous in 30 minutes. Cooled to room temperature, the composition remained clear and fluid for two hours before it began to become cloudy. The solution was warmed to 40° C. and then, by means of a leveling blade set at 0.015", was flowed in a uniform layer on a glass plate at a temperature of 40° C. The solvent was allowed to evaporate at 40° C. (about 5 minutes) until a film was obtained that was dry to the touch. This film has a thickness of 0.0017" and was clear, strong, and pliable.

*Example II*

A mixture of 7.4 parts of interpolyamide described in Example I, 6 parts of amylbenzenesulfonamide, 32 parts of ethanol, and 8 parts of water, was heated and stirred under reflux at 70° C. for one hour. The resulting homogeneous solution remained fluid for 29 hours at room temperature. A film was cast by the procedure described in Example I, except that the solution and plate were at room temperature. The film was tack-free in 20 minutes and was completely dry in one hour. When removed from the plate, it had good clarity, drape, and strength.

Example III

A composition containing 550 parts of the interpolyamide described in Example I, 306.8 parts of amylbenzenesulfonamide, 1345 parts of benzene-denatured alcohol, and 426 parts of water was heated and stirred under reflux at 70° C. for 3 hours and the resulting homogeneous solution was cooled to 35° C., and filtered through a pressure filter. To 2508 parts of the filtered product was added 556 parts of a ball milled mixture of amylbenzenesulfonamide and a commercial pigment mixture in the ratio of one part amylbenzenesulfonamide to three parts of pigment, and the composition was heated and stirred for 7 hours, when it was completely homogeneous. This composition remained stable for more than two days at room temperature. It was used to coat fabric by spreading the solution on the fabric with a leveling blade, drying in a heated chamber with circulation of air at 65° C., applying another coating of solution, and repeating the process until the coating reached the desired weight. The product possessed extremely good pliability, appearance, and durability.

Example IV

A mixture of 7.4 parts of the interpolyamide described in Example I, 6 parts of amylbenzenesulfonamide, 36 parts of ethanol, and 4 parts of water was heated for one hour, the solution then having become homogeneous and viscous. It was used as an adhesive for anchoring together two strips of a pigmented, plasticized polyamide interpolymer composition, by coating each inner surface of the strips with the solution, allowing the coatings to dry until tacky, and pressing the coated faces together. Adhesion was good, and the product, when worn as a wrist watch strap, did not lose adhesion in three months.

Example V

A mixture of 10 parts of the interpolyamide described in Example I, 25.6 parts of isopropanol, and 8 parts of water was heated and stirred for one hour. The resulting homogeneous solution was cooled to 40° C. and cast under a 0.030" leveling blade according to the procedure described in Example I. The resulting film was smooth and very clear.

Example VI

Ten parts of an interpolymer prepared by the interpolymerization of 60 parts of hexamethylene diammonium sebacate and 40 parts of caprolactam was heated and stirred in 90 parts of a solvent mixture consisting of benzene-denatured alcohol diluted with 20% water by volume. The solution was clear and homogeneous and could readily be cast into attractive films.

In order to demonstrate that the solubility of the interpolyamide varies with its composition, and reaches an optimum in the range of the preferred composition, two series of interpolymers were prepared, the members of each differing from each other only in the relative amounts of the respective components used in their preparation. In each instance, ten parts of the interpolyamide was treated with 90 parts of a solvent consisting of benzene-denatured alcohol containing 20% water by volume. The results are summarized in the following tables:

Table I

| Polymer (hexamethylene diammonium adipate: caprolactam) | | Solubility |
|---|---|---|
| Ratio of salt to caprolactam | | |
| Molar ratio | Weight ratio | |
| 8.5:80 | 20:80 | Slightly soluble. |
| 19.1:60 | 40:60 | Completely soluble. |
| 25.6:40 | 60:40 | Do. |
| 29.8:30 | 70:30 | Slightly soluble. |

Table II

| Polymer (hexamethylene diammonium sebacate: caprolactam) | | Solubility |
|---|---|---|
| Ratio of salt to caprolactam | | |
| Molar ratio | Weight ratio | |
| 29:20 | 80:20 | Slightly soluble. |
| 21.8:40 | 60:40 | Soluble in high concentration. |
| 18.2:50 | 50:50 | Do. |
| 14.5:60 | 40:60 | Partly soluble. |
| 7.24:80 | 20:80 | Slightly soluble. |

In order to demonstrate that solution stability is a function of the solvent composition, a number of solutions were prepared according to the technique described above, using in each case 55 parts of the preferred interpolyamide (prepared from 60 parts hexamethylene diammonium adipate and 40 parts caprolactam), 45 parts of amylbenzenesulfonamide, and 300 parts of the solvent mixture, whose composition is described in the following table. Although stability at room temperature is influenced by such factors as the size of the sample under observation, and the time and temperature of the heating step used to induce solution, the results shown in this table are comparable among themselves.

Table III

| Per cent alcohol in solvent (by volume) | Hours before Gelling at 27° C. |
|---|---|
| 100 | Insoluble (swollen). |
| 95 | 0.5–1. |
| 90 | 3–5. |
| 85 | 28. |
| 80 | ca. 35. |
| 75 | 44–60. |
| 65 | 46. |
| 60 | 14–30. |
| 55 | 0. |
| 45 | Insoluble (slightly swollen). |

The interpolyamides possessing the most desirable properties for the practice of this invention are those prepared from 6-aminocaproic acid, diprimary diamines having a radical length of 8–14, and dibasic carboxylic acids having a radical length of 6–12, the molar ratio of the diamine to the amino acid ranging from 4:1 to 1:20, the diamine and dibasic acid being used in substantially equimolecular amounts. The term "radical length" is used as defined in U. S. Patent 2,130,523. The most valuable of these interpolyamides are those wherein the molar ratio of the diamine to the amino acid ranges from 1:1 to 1:4. The polyamide-forming reactants which may be used in making the interpolyamides of this invention are those useful in the preparation of simple polyamides and described in U. S. Patents 2,071,253 and 2,130,523. The preferred reactants are amino acids represented by the general formula

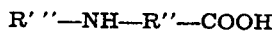

in which R''' is a univalent organic radical or hydrogen and R'' is a divalent hydrocarbon radical having a chain length of at least 5, diamines of the formula NH₂CH₂RCH₂NH₂, and dicarboxylic acids of the formula

in which R and R' are divalent hydrocarbon radicals and in which R has a chain length of at least 2 carbon atoms. Preferably R and R' contain from 2 to 8 carbon atoms. Mixtures of such diamines, mixtures of such dibasic acids, and mixtures of such amino acids also may be used. As previously indicated, the amino acid may be replaced by its lactam, nitrile, or other amide-forming derivative, and the diamines and dibasic acids likewise may be replaced by their amide-forming derivatives. Aromatic reactants, e. g., diphenic, isophthalic and terephthalic acids, and meta and para phenylene diamines are also useful ingredients.

It is to be understood that the term "synthetic linear polyamide" as used in this application includes not only polymers derived from polyamide-forming reactants above, but also polymers derived from polymer-forming compositions containing in addition to polyamide-forming reactants some other bifunctional polymer-forming reactants, e. g., glycols or hydroxy acids. Such polymers are characterized in that they contain a plurality of amide groups in the main chain of atoms in the polymer chain.

A number of alcohols may be used in admixture with water as solvents for interpolyamides in the practice of this invention. As suitable alcohols may be mentioned methanol, ethanol, n-propanol, i-propanol, n-butanol, i-butanol, the amyl alcohols, furfuryl alcohol, ethylene glycol, ethylene glycol monomethyl ether, allyl alcohol, methallyl alcohol, benzyl alcohol, and diacetone alcohol. Mixtures of such alcohols also may be used, and the alcohols may be diluted with inert diluents, such as benzene, ethyl acetate, diethyl ether, petroleum ether, formamide, and dioxane. Saturated alcohols, particularly saturated aliphatic alcohols containing less than six carbon atoms, are preferred, because of their volatility and miscibility with water.

Particular mention should be made of i-propanol. Solutions in mixtures of this alcohol and water, while not as stable as ethanol-water solutions, are of especial value in that they permit the casting of particularly clear and brilliant films even under conditions which, with other alcohols, tend to give hazy films.

It is frequently advantageous to use mixtures of two or more alcohols with water. In this manner, alcohols which are generally immiscible with water may be used as solvents, by the addition of a water-miscible alcohol. Furthermore, the use of such alcohol mixtures permits modification and control of the rate of solvent evaporation and the composition of residual solvent at all times, factors which are of very great importance in the preparation of smooth, glossy, clear, strong films or filaments.

As previously indicated, the ratio of alcohol to water which is used in the solvent may be varied according to the composition of the solution and the use to which the solution is to be put. The per cent of water may be varied from 1 to 50% by volume, but an optimum value, especially where the alcohol used is ethanol and the polymer is the interpolyamide described in Example I, is 20-30% by volume of water.

Solutions in unsaturated alcohols are improved by the addition of small amounts of water, even though the alcohol itself has considerable solvent action on the interpolyamides and may not be highly miscible with water. Thus a 10% solution of the preferred interpolyamide in allyl alcohol gels in 2–3 hours at room temperature, but a similar solution containing 1% of water does not gel for 24 hours, and a solution containing 15% of water is indefinitely stable at room temperature.

The addition of phenols or aromatic sulfonamides is often of especial value, not only in improving the flexibility of the film or filament cast from the solution, but also in decreasing the viscosity and improving the stability of the solution at room temperature. Solution stability also may be improved by the addition of small amounts of other agents, such as aniline or thiourea.

The solutions will tolerate large amounts of inorganic pigments and pigment mixtures. When pigment mixtures containing pigments of varying specific gravities are used, it is desirable that the solutions possess as high a viscosity as is practical to prevent the heavier pigment components from settling and the lighter ones from rising to the surface of the solution.

The solids content of the solutions may be varied between very wide limits, depending on the composition and on the proposed use. Thus, unplasticized, unpigmented, unmodified polymer may be dissolved satisfactorily at 20% or less solids and the resulting solution may be used at room temperature for a considerable period of time before gelling. Higher solids content, up to 50%, likewise may be achieved, and may even be desirable where a high viscosity solution is necessary. Such concentrated solutions are most conveniently handled at elevated temperatures, such as 40–70° C. When highly active plasticizers are used, solids content may be greatly increased. Thus, when the preferred interpolyamide is plasticized with 45% amylbenzenesulfonamide, solutions of 45% solids may be conveniently handled at room temperature, and solutions of higher solids may be used at elevated temperatures. The addition of such insoluble solids as pigments or fillers to the solution is often advantageous, since such materials appear to have no effect on solution stability and only a slight effect on solution viscosity, and therefore may be added in relatively large amounts, thus increasing the solids content of the fluid composition.

Many types of modifying agents other than plasticizer and pigments may be employed, for example, resins, cellulose derivatives, other film-forming materials, waxes, water repellents, luster modifying agents, dyes, antioxidants, oil, antiseptics, and the like.

The time and temperature necessary to dissolve polyamides in the solvents of this invention will vary with the compositions, and also with the state of subdivision of the polyamide. Thus, a highly plasticized and finely divided interpolyamide will be dissolved rapidly at low temperatures, while an unmodified massive interpolyamide may require several hours of heating and stirring. In general, compositions will be found to be homogeneous in 1-3 hours of stirring with heating at 50-70° C. It is generally advisable, nevertheless, to continue the period of heating and stirring for 2-3 hours after solution appears to be complete. Tests have shown that periods of heating as long as 51 hours have no deleterious effects on the tensile strength of films cast from such solutions, and 2-3 hours' heating after solution has been effected generally results in improved stability of solution.

Dilute solutions of highly plasticized interpolyamides may be prepared simply by stirring or tumbling the components at room temperature, but it generally is more efficient to conduct the stirring or tumbling at elevated temperatures ranging from 50 to 70° C.

Casting conditions will vary with the properties of the film desired, as has been indicated. In general, films may be cast at temperatures ranging from 15 to 70° C. Coagulative methods, as by the addition of nonsolvents, may also be used for the regeneration of the polymer from the solutions of this invention.

Clear strong films may be cast from alcohol-water solutions. While the optimum conditions will vary with the interpolyamide used, the alcohol used, the relative amounts of alcohol and water, and the presence or absence of modifying agents such as plasticizers, certain rules may be stated. Thus, for solutions in ethanol-water mixtures, the clearest films are usually obtained by (1) casting from relatively dilute solution, (20% solids), (2) casting from solutions which contain as little water as is necessary for proper solution stability in the particular operation intended, (3) casting at somewhat elevated temperatures, as 40-60° C., (4) casting films as thin as is practical. While not all these precautions need be observed at the same time, it is generally advantageous to observe at least three of the four.

Conversely, by failing to institute a sufficient number of these conditions, it is possible to cast films which are cloudy, or even opaque. Such films are of value in certain applications, such as dull topcoats for coated fabrics, and, being more permeable to moisture than clear films, may also be used to advantage in artificial leather when "breathing" is desirable. Such opaque films are only slightly weaker than clear films of corresponding composition.

Solutions of the interpolyamides in alcohol-water solvents are useful for forming a variety of objects by a process of solvent evaporation or coagulation. Typical objects which can be formed from these solutions are fibers, filaments, bristles, surgical sutures, fishing leaders, fish line, dental floss, films, ribbons, sheets, safety glass interlayers, golf ball covers, and plasticized or otherwise modified solid compositions useful in making molded articles. The solutions are especially useful for application as lacquers on wood, metal, glass and other surfaces, for coating wire, fabrics, paper, leather, regenerated cellulose, and the like, and for impregnating fabric, paper, and the like. As examples of especially valuable coated fabric products which may be prepared by the practice of this invention may be mentioned coated fabrics for use as artificial leather, and the like. The solutions are also useful in various adhesive applications, in the preparation of plywood and laminated materials, and in the sizing of fabrics. Another use of polyamide solutions is in the preparation of finger nail polishes.

As many apparently widely different embodiments of this invention may be made without departing from the spirit and scope thereof, it is to be understood that I do not limit myself to the specific embodiments thereof except as defined in the appended claims.

I claim:

1. A solution in a solvent medium comprising a mixture of alcohol and water, of a synthetic linear interpolyamide obtained by interpolymerization of polymer-forming reactants comprising a monoaminomonocarboxylic acid, a diamine having at least one hydrogen atom on each amino nitrogen atom, and a dibasic carboxylic acid: said solvent medium being chemically inert with respect to said interpolyamide.

2. A solution in a solvent medium comprising a mixture of water and saturated aliphatic alcohol having less than 6 carbon atoms, of a synthetic linear interpolyamide obtained by interpolymerization of polymer-forming reactants comprising a monoaminomonocarboxylic acid, a diamine having at least one hydrogen atom on each amino nitrogen atom, and a dibasic carboxylic acid; the water to alcohol ratio of the said mixture being within the range 10:90 to 40:60, by volume, the molar ratio of diamine-dibasic carboxylic acid constituent to monoaminomonocarboxylic acid constituent of the said interpolyamide being within the range 1:1 to 1:4, and the said solvent medium being chemically inert with respect to the said interpolyamide.

3. A solution in a solvent medium consisting essentially of a mixture of water and ethyl alcohol in the range of 20:80 to 30:70, by volume, of an interpolymer obtained by interpolymerization of 6 parts of hexamethylene diammonium adipate and 4 parts of caprolactam: said solvent medium being chemically inert with respect to said interpolyamide.

4. The solution set forth in claim 2 wherein the said alcohol is ethyl alcohol.

5. The solution set forth in claim 2 wherein the said alcohol is iso-propyl alcohol.

6. The solution set forth in claim 2, wherein the said alcohol is an unsaturated alcohol, and the said solution contains at least 15% of water.

7. The solution set forth in claim 3, wherein the said solution contains a plasticizer for the said interpolymer.

8. The solution set forth in claim 3, wherein the said solution contains an aryl sulfonamide plasticizer for the said interpolymer.

9. The process of preparing the solution set forth in claim 1 which comprises agitating the said synthetic linear interpolyamide in the said solvent medium until solution is effected, and then continuing the agitation until the stability of the solution towards gelation has been increased.

10. A solution in a solvent medium comprising a mixture of alcohol and water, of a synthetic linear interpolyamide obtained by interpolymerization of polymer-forming reactants comprising omega-aminocaproic acid, hexamethylene diamine, and adipic acid, said solvent medium being chemically inert with respect to said interpolyamide.

ROBERT M. LEEKLEY.

CERTIFICATE OF CORRECTION.

Patent No. 2,320,088.                                              May 25, 1943.

ROBERT M. LEEKLEY.

It is hereby certified that error appears in the printed specification of the above numbered patent requiring correction as follows: Page 2, second column, line 64, Example 1, for "has" read --had--; page 5, second column, line 43, claim 3, for "interpolyamide" read --interpolymer--; and that the said Letters Patent should be read with this correction therein that the same may conform to the record of the case in the Patent Office.

Signed and sealed this 6th day of July, A. D. 1943.

Henry Van Arsdale,
(Seal)                                  Acting Commissioner of Patents.